Oct. 4, 1966 D. F. WOOR ETAL 3,276,548
SAFETY DEVICES FOR HOISTS
Filed Aug. 25, 1964 8 Sheets-Sheet 5

Fig. 7.

INVENTORS
DENIS FREDERICK WOOR
RONALD EDWARD FARNFIELD
THOMAS ERIC GREENWOOD
BY
MASON, KOLEHMAINEN, RATHBURN & WYSS
ATTORNEYS

Oct. 4, 1966

D. F. WOOR ETAL 3,276,548

SAFETY DEVICES FOR HOISTS

Filed Aug. 25, 1964

INVENTORS
DENIS FREDERICK WOOR
RONALD EDWARD FARNFIELD
THOMAS ERIC GREENWOOD
BY
MASON, KOLEHMAINEN, RATHBURN
& WYSS
ATTORNEYS

Fig. 18.

United States Patent Office

3,276,548
Patented Oct. 4, 1966

3,276,548
SAFETY DEVICES FOR HOISTS
Denis Frederick Woor, Ronland Edward Farnfield, and Thomas Eric Greenwood, Devon, England, assignors to Tecalemit (Engineering) Limited
Filed Aug. 25, 1964, Ser. No. 391,974
Claims priority, application Great Britain, Aug. 28, 1963, 34,132/63
13 Claims. (Cl. 187—8.47)

This invention relates to lifts or hoists, which will be generally referred to hereinafter simply as hoists, such as are used for raising vehicles or other equipment, in order, for example, that the vehicle or equipment may be worked on from underneath. The present invention is concerned with the provision of safety mechanism for use with such hoists in order to reduce the risk of injury or damage being caused should the hoist be lowered while an article or a person (or a part of a person, such as a foot), is underneath the hoist.

The invention accordingly provides safety mechanism for a hoist having a platform and means for raising and lowering this platform, wherein the safety mechanism includes at least one safety member mounted beneath the hoist platform and control means responsive to movement of the safety member due to pressure upon it for preventing at least downward movement of the platform.

It is preferred that the safety member should be resiliently mounted beneath the platform in such a way that downward movement of any part of the safety member will operate the control means to prevent downward movement of the platform, but, as will appear from the following description, it is possible to use a safety member which is so arranged that only part of it can move downwardly to operate the control means.

The safety member, which may be in the form of a flat plate, frame or the like, may be mounted on and close to the surface of the ground or floor beneath the hoist platform or it may be mounted in a recess formed in this ground or floor so as to be substantially flush with the surface of the latter.

The invention provides a number of ways of supporting the safety member and of ensuring that downward movement of any part or of a selected part of it will operate the control means. The safety member may, for example, be resiliently mounted on springs or on blocks or other members made of a resilient material. In this case one or, preferably, a number of electrical switches or fluid valves is or are mounted on or adjacent the safety member and are arranged so that downward movement of this member, or of a part of it, operates the control means to stop downward movement of the hoist platform. It is, however, also possible, and this forms an important feature of the present invention, to mount the platform so that it is wholly or partly supported on one or more hollow, resiliently-deformable members which are filled with a fluid, preferably a liquid, and which are connected with a control unit through a pipe or pipes so that downward movement of the safety member or of part of it displaces fluid, the pressure of which, acting on the control unit, causes the latter to operate to prevent downward movement of the platform. The fluid filled member or members preferably takes or take the form of one or more lengths of tubing which are filled with liquid and which are arranged according to a suitable pattern beneath the safety member. It would, however, be possible to use a number of individual fluid-filled deformable members, such as members of the bellows type, to support or assist in supporting the safety member.

As will appear from the following description the invention, besides providing a number of different arrangements of safety member, including means for supporting it and for causing downward movement of the member, or of part of it, to operate the control means to stop downward movement of the platform, also provides a number of control units which can be connected to the safety member so as to be operated by the latter and which include a number of useful features which will assist in the setting up and maintenance of the safety mechanism and in ensuring that it is reliable in its operation.

For the better understanding of the invention reference will be made to the accompanying drawings, in which.

Referring first to FIGURES 1 to 4, these show a hoist having a platform 1 which is supported at its corners on four columns 2 up and down which it can be moved by any suitable mechanism, which mechanism is shown as being operated by an electric motor 3, although hydraulic or other mechanism for raising the platform 1 could be used.

Figure 1:
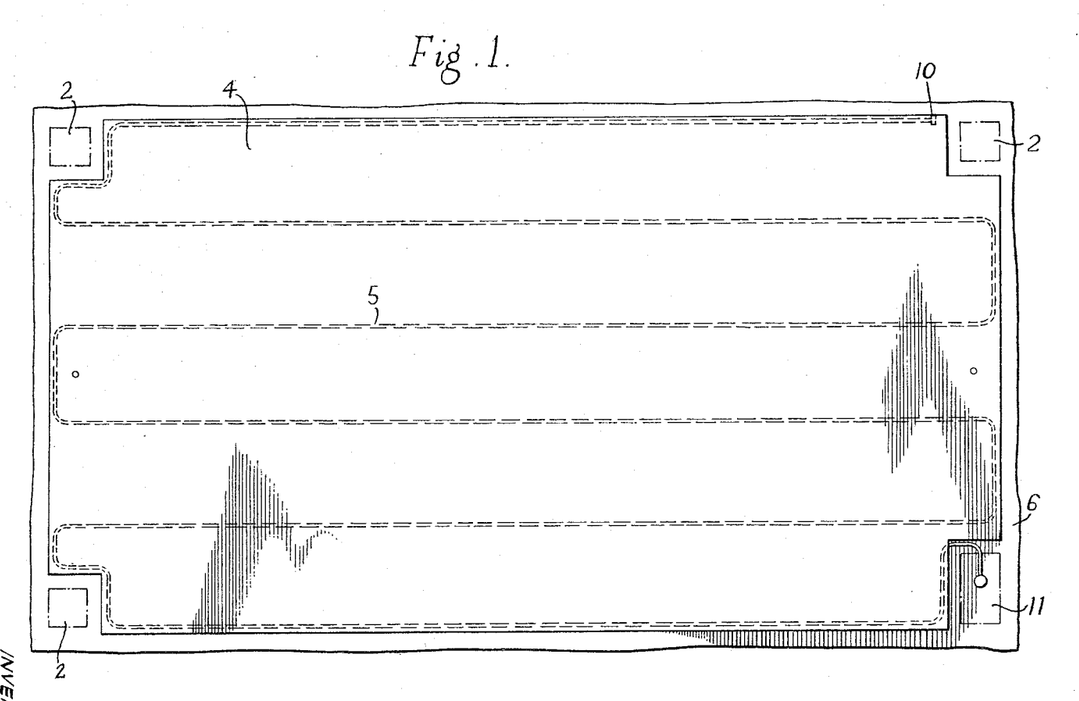
FIGURE 1 is a plan view showing part of a safety mechanism which includes a safety member in the form of a single plate which is arranged to cover the floor beneath the platform of a hoist of the four column type.
Figures 2, 3:
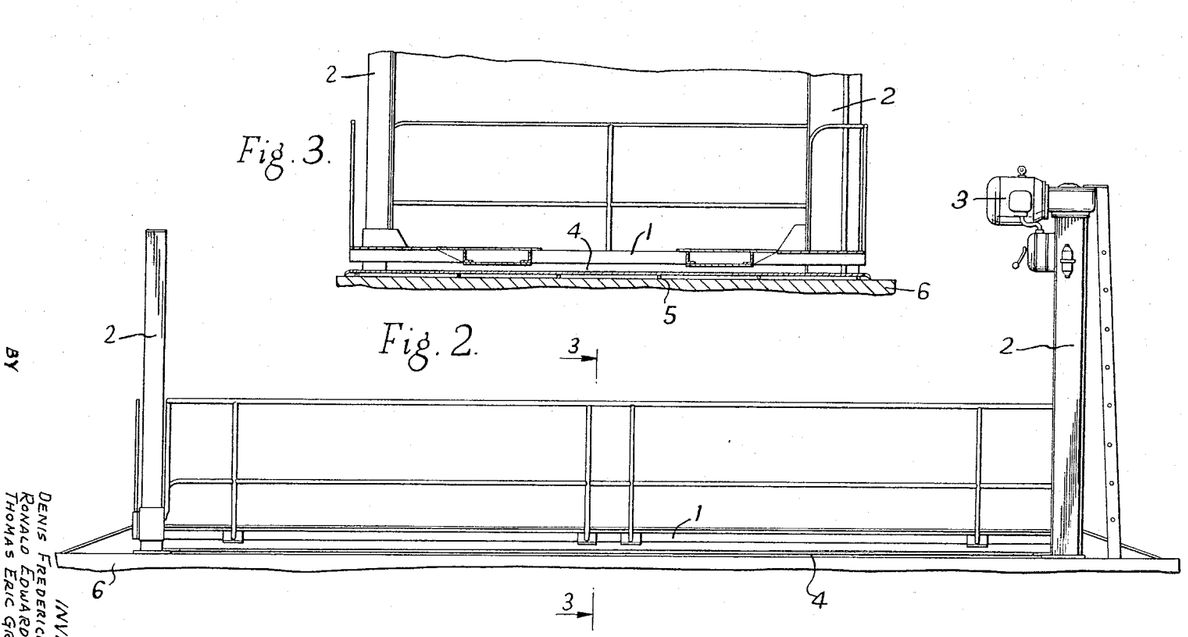
FIGURE 2 is a side view of the hoist with the safety mechanism of FIGURE 1.
FIGURE 3 is a part sectional view taken on the line 3—3 of FIGURE 2.
Figure 4:
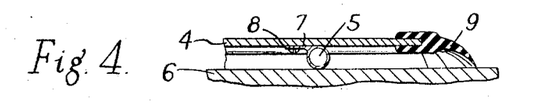
FIGURE 4 is a detail sectional view showing one edge of the safety member of the mechanism shown in FIGURES 1 to 3.

A safety member in the form of a floor plate 4, which is located beneath the platform 1, rests upon one or more lengths of flexible tubing 5 so as to be resiliently supported upon and close to the floor 6 on which the hoist is mounted. As shown in FIGURE 4 the tubing 5 may include an integral tangentially-directed flange 7 which is screwed or otherwise secured to the floor plate 4, for example, by means of screws 8.

The tubing 5 is filled with a liquid which may, if necessary, include anti-freeze and corrosion inhibiting additives.

The edge of the plate 4 is shown as being fitted with a strip 9, which may be made, for example, of an extruded resiliently deformable plastics material. Such a strip is preferably provided so as to seal the gap between the floor 6 and the edges of the plate 4 in order to prevent the ingress of foreign matter under the plate 4.

At one end the tubing 5 is provided with a vent valve 10 (FIGURE 1), while its other end is connected to a safety control unit which is indicated generally at 11.

Figure 5:
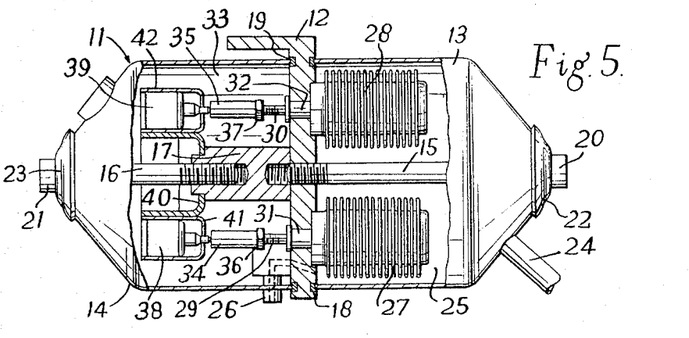
FIGURE 5 is a sectional view showing a safety control unit which may be used in the safety mechanism shown in FIGURES 1 to 4.

This control unit 11, as shown in FIGURE 5, includes a central plate 12, on opposite sides of which there are fitted covers 13 and 14. These are secured by studs or bolts 15 and 16, the threaded ends of which are screwed into the plate 12 and into a central boss 17 which is secured to this plate. The covers 13 and 14 are in this way clamped against the opposite sides of the plate 12, fluid seals 18 and 19 being provided so as to maintain fluid tightness between the plate 12 and the two covers. The heads 20 and 21 of the bolts 15 and 16 are shown as engaging caps 22 and 23 on the covers 13 and 14, where sealing rings (not shown) may be provided if necessary.

A pipe 24 which communicates with the chamber 25 within the cover 13 is connected to the end of the tubing 5 remote from the vent valve 10.

A non-return valve 26 (indicated diagrammatically) which may be of the "Schrader" type, for example, is arranged on the plate 12 and connects the chamber 25 to atmosphere.

By means of this valve 26 and the vent valve 10 at the other end of the tubing 5 it is possible to fill the chamber 25 and tubing 5 completely with liquid and to vent any air from the system.

Two identical bellows 27 and 28, which have their open ends attached to the plate 12, are fitted within the chamber 25. Rods 29 and 30 are arranged within these bellows and have their ends connected to the sealed ends of the bellows.

These rods 29 and 30 are slidable in bushes 31 and 32, respectively, which bushes are mounted in the plate 12. The ends of the rods 29 and 30, which project into the chamber 33 within the cover 14, are threaded and are provided with adjustable thimbles 34 and 35 and with lock nuts 36 and 37, respectively.

A normally closed micro-switch 38 and a normally open micro-switch 39 are mounted within the chamber 33 upon a bracket 40, which is carried by the boss 17. These two switches are so arranged that the switch 38 is operable by movement of the thimble 34, while the switch 39 is operable by movement of the thimble 35. The two micro-switches 38 and 39 are prevented from over-travel by means of stop plates 41 and 42, respectively.

The chamber 25 and the tubing 5 are filled with fluid through the non-return valve 26 by means of a pump, so that the fluid is under slight pressure. The thimbles 34 and 35 are next adjusted so as to be in contact with their respective micro-switches 38 and 39, the arrangement being such that both switches are in their closed positions. In the case of an electrically operated hoist these micro-switches are connected in series with the holding coil of the motor control unit (not shown) in such a way that if either of the switches is opened then the electrical circuit of the motor will be broken and the motor will stop, thus preventing any further movement of the hoist. If necessary an electrically controlled brake may also be caused to engage at the same time.

If now a person or an object stands or is left on the plate 4 the added weight will slightly compress at least part of the tubing 5 and will increase the pressure of the liquid within the chamber 25. Accordingly the bellows 27 will be compressed and the contacts of the micro-switch 38 will open. Similarly if there is a loss of pressure within the tubing 5 and chamber 25 as a result, for example, of leakage or from a puncture in the tubing 5, this will allow the bellows 28 to expand, thus opening the contacts of the micro-switch 39. Thus, in either of these cases the hoist will be rendered inoperative.

Figure 6:
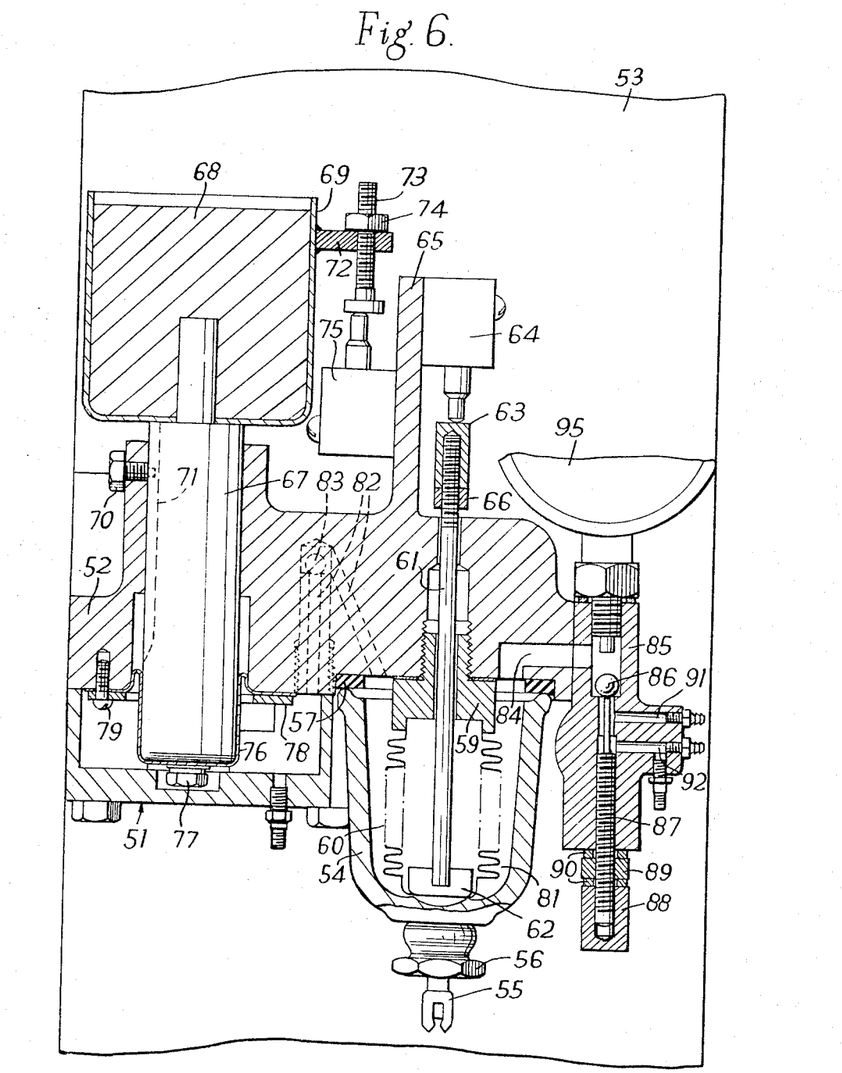
FIGURE 6 is a sectional view showing another form of safety control unit.

Referring now to FIGURE 6, this shows another form of safety control unit 51. This may be used in place of the unit 11 which has been described except that the unit 51 is designed to be connected to both ends of the tubing 5. This provides the advantage of increasing the sensitivity of the safety mechanism, whilst the unit 51 has other advantages over the unit 11.

The unit 51 comprises a main body 52 which may be mounted on one of the columns of the hoist or on another suitable support, which is indicated generally at 53. A bowl 54, which is preferably made of glass or other transparent material, is fitted under part of the body 52, to which it is clipped by means of a stirrup, which is indicated at 55 and which is tightened by means of a nut 56. A sealing ring 57 is fitted between the body 52 and the bowl 54.

A plug 59 is screwed into the body 52 within the bowl 54 and carries bellows 60. A rod 61 passes slidably through bores formed in the body 52 and plug 59 and its lower end carries a head 62 which rests on the closed lower end of the bellows 60.

The upper end of the rod 61 is threaded and carries an adjustable cap nut 63, which engages the operating plunger of a micro-switch 64. This latter is mounted on a part 65 of the body 52. The cap nut 63 can be locked in position on the rod 61 by tightening a lock-nut 66.

Slidably mounted in a part of the body 52 is a piston 67. This is weighted by means of lead 68, which is cast in a cup 69 fitted on the upper end of the piston.

The piston 67 and cup 69 are prevented from turning by means of a screw 70, the reduced end of which engages in a groove 71 formed in the piston 67. The cup 69 carries a bracket 72 in which an adjustable stud 73 is screwed. This stud, which can be locked in position by tightening a lock-nut 74, is arranged to engage and operate a micro-switch 75 arranged below it.

The lower end of the piston 67 engages in a flexible diaphragm 76, which may be of the "Bellofram" or other suitable type, to which it may be secured by means of a stud 77. The edges of this diaphragm are secured to the body 52 by means of a ring 78 and screws 79.

The weight 68 carried by the piston 67 is of such a value as to maintain the required pressure of the liquid in the system. For this purpose the chamber 80 below the diaphragm 76 is connected with the chamber 61 surrounding the bellows 60 by passages in the body 52. These passages are indicated at 82 and include a non-return ball valve 83.

The chamber 81 communicates by means of a passage 84 with a unit 85 containing a ball valve 86. This valve is of an adjustable-restriction, non-return type, the closing of the valve being limited by an adjustable plunger 87. This plunger is screwed into the body 85 and it can be locked in its adjusted position by means of a cap 88 and lock nut 89, sealing washers 90 being provided as shown.

Ports 91 and 92 in the unit 85 are arranged for connection to the opposite ends of the pressure tubing beneath the safety member, whilst port 92 is fitted with a non-return valve 93 of the Schrader or similar type. This valve, and also a similar valve 94 fitted to the chamber 80, are used when priming the system.

A pressure gauge 95 indicates the pressure in the system. The mechanism is set up as follows:

The plunger 87 is first screwed in so as fully to open the ball valve 86 and to cover the port 92. The valve 93 is opened (by removal of its core) and a pump of any suitable type is connected to the valve 94. The position of the screw 73 is adjusted so that it operates the micro-switch 75 and holds the contacts of the latter open when the piston 67 is in its lowermost position, as shown.

The operating liquid is now pumped into the system through the valve 94. This liquid will pass the ball valve 83 into the chamber 81, whence it will be forced past the valve 86 and port 91 into the pressure tubing. Air from the system will be discharged through the valve 93.

When the system is full of liquid, the valve 93 is closed, by replacing its core, and pumping is continued until the piston 67 has been raised almost to its uppermost position, in which the stud 73 is well clear of the micro-switch 75, the latter then being closed. The pressure in the system will be indicated by the gauge 95.

The plunger 87 is then unscrewed so as to allow the ball valve 86 almost to return to its seat and the plunger is locked in this position. The cap nut 63 is adjusted so that the micro-switch 64 just closes.

The system is now ready for use. Any increase of load on the safety member will compress the pressure tubing, and will force some of the liquid in it past the ball valve 86. This liquid cannot, however, pass the valve 83, so its pressure, by acting on the bellows 60, will force up the rod 61 and will operate the micro-switch 64.

When the load is removed from the safety member, the ball valve 86 will restrict the rate of flow of the liquid back to the pressure tubing and will thus limit the rate of downward movement of the rod 61. This provides a delay in the closing of the switch 64, and thus fulfils a safety function.

The valve 83 allows liquid to flow freely from the chamber 80 and thus keeps the pressure tubing and the rest of the system filled, which is done under a constant pressure determined by the weight 68. This pressure will be maintained even if the tubing should stretch, as it may tend to do during use, but should this stretching be excessive, or should a leak occur in the system, the further downward movement of the piston 67 will open the switch 75, thus preventing further operation of the hoist until after the system has been checked and re-primed through the valve 94.

Figure 7:
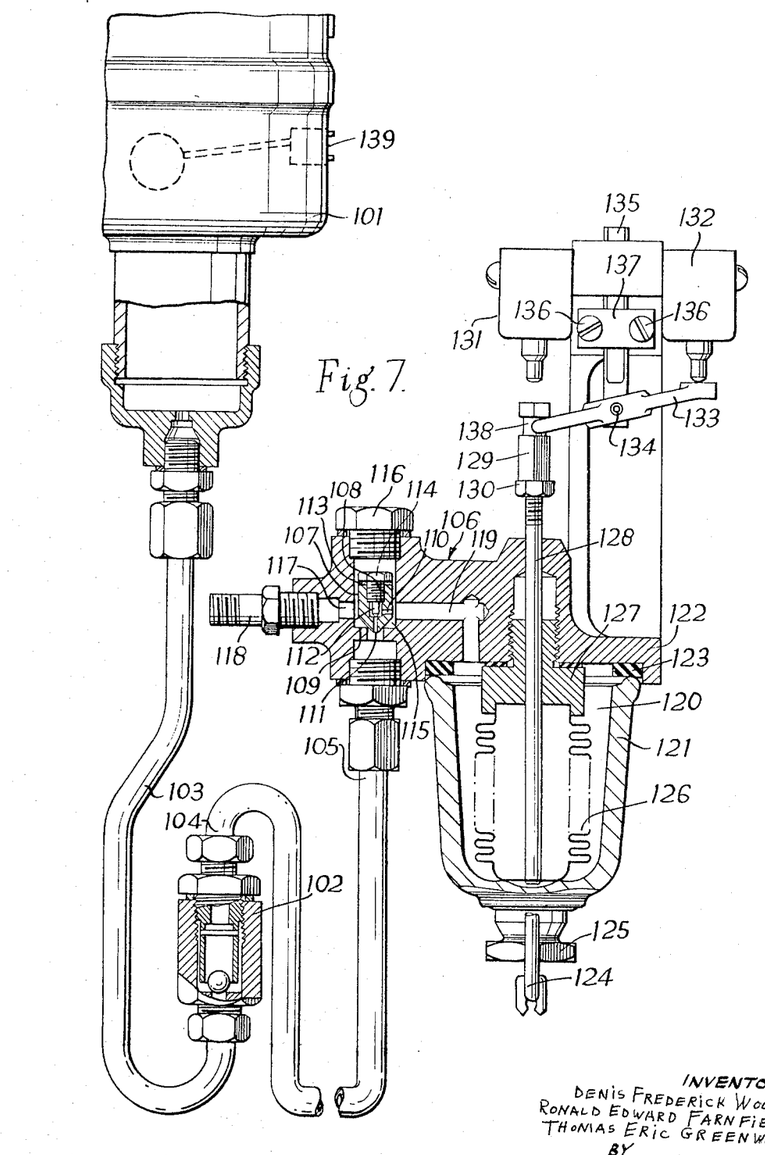
FIGURE 7 is a sectional view showing a further improved form of safety control unit.

Referring now to FIGURE 7, this shows another safety control system of a kind which includes a feed unit connected to one end of the pressure tubing and a control unit which is connected to the other end of this tubing.

The feed unit comprises a reservoir 101, which is mounted at a sufficient height above the safety member to maintain a predetermined pressure in the pressure tubing under the latter. The reservoir 101 is connected to this tubing by way of a non-return valve 102, which is shown as being of the ball type. This valve is connected to the reservoir by a pipe 103 and to the pressure tubing (not shown) by a pipe 104.

The other end of the pressure tubing is connected by a pipe 105 to a control unit, which is indicated generally at 106.

The flow of liquid through the pipe 105 between the pressure tubing and the unit 106 is controlled by a restricted-return one-way valve 107. This comprises a valve piston 108 the lower tapered end of which normally engages a valve seat, indicated at 109, and cuts off return flow of the liquid from the unit 106 to the pipe 105 except for a restricted flow through passages 110 and 111 drilled in the valve piston 108. The amount of this restricted return flow is determined by the position of the tapered end of a plug 112 which is screwed into the piston 108, the position of which plug is itself determined by the thickness of a washer or washers 113 fitted between its head 114 and the piston 108.

The upper end of the chamber 115 in which the valve 107 operates has its upper end closed by a plug 116. It also has a side port 117, which is normally closed by a non-return bleeder valve 118, which may be of the Schrader or other suitable type. The chamber 115 is also connected by passages 119 with a chamber 120 provided by a bowl 121. This bowl, which is preferably made of glass or other transparent material, is clamped against the body 122 of the unit 106 with the interposition of a sealing washer 123 by means of a stirrup 124 and nut 125.

The bowl 121 contains bellows 126, the upper end of which is secured to a plug 127 screwed into the body part 122. An operating rod 128 has its lower end fixedly secured by soldering or other means to the lower end of the bellows 126 and it passes slidably through the plug 127 and body 122.

The upper threaded end of the rod 128 carries a head 129 which can be locked in its adjusted position on the rod by tightening a clamping nut 130. This head 129, which is itself arranged to engage and operate a micro-switch 131 is also arranged to operate another micro-switch 132, which it does through a rocker 133. This rocker is pivoted at 134 to an adjustable support 135, which latter is held in its adjusted position by tightening two screws 136 which hold a bridge piece 137. One end of the rocker 133 engages in a groove 138 formed in the head 129, whilst its other end engages and operates the micro-switch 132.

Both the switches 131 and 132 are of the normally-closed type, and they they are both closed when the rod 128 and rocker 133 are in intermediate positions in which the rocker 133 is substantially horizontal. Downward movement of the rod 128 will cause the switch 132 to be opened by the rocker 133, whereas upward movement of the rod 128 will open the switch 131.

The setting up of the apparatus will now be described:

The reservoir 101 is filled with liquid, which is allowed to fill the pressure tube and the rest of the system, air being allowed to escape by opening the bleeder valve 118. When the system is filled with liquid, the bleeder valve 118 is closed. Owing to the pressure of the liquid acting on the bellows 126, the rod 128 will be held in an intermediate position. With the rod in this position, its head 129 is adjusted to ensure that the rocker 133 is horizontal, so that both the switches 131 and 132 are closed.

Any increase in pressure due to an object or person pressing on the safety member will be transmitted to the liquid in the chamber 120, since the liquid cannot return to the reservoir 101 owing to the action of the non-return valve 102. Thus, the pressure increase will move the rod 128 upwardly and will open the micro-switch 131, thereby preventing operation of the hoist. A release of the force acting on the safety member will allow the liquid to flow back to the pressure tubing from the chamber 120, thereby allowing the switch 131 to close again, but this will be delayed by a time depending on the setting of the valve 107.

Stretching or expansion of the pressure tubing will be accommodated by further liquid supplied from the reservoir 101, but should the liquid in the reservoir drop below a certain level, as a result, for example, of leakage in the system, it is arranged to operate a float switch 139. This is arranged to operate a warning device, or alternately, it could be arranged to stop further operation of the hoist by connecting the switch 139 in series with the switches 131 and 132.

Figure 8:
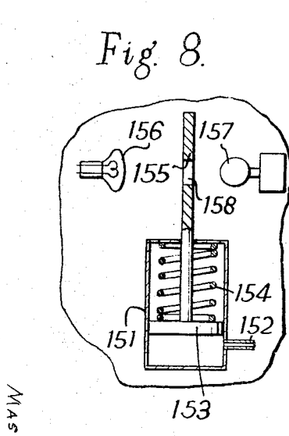
FIGURE 8 is a diagrammatic sectional view showing yet another form of control unit.

FIGURE 8 shows another form of safety control unit. This comprises a cylinder 151, which is connected by an inlet 152 to the pressure tubing. The cylinder 151 contains a piston 153 which is held against the force of a compression spring 154 by the pressure of the liquid in the cylinder.

Mounted on or connected with the piston 153 is a shutter 155. This shutter is arranged between a light source 156 and a photo-electric cell 157; it is formed with a port 158. The position of this port is such that when the piston 153 is held in its normal working position by the pressure of the liquid in the system light from the source 156 reaches the cell 157. Should however, the pressure of the liquid be increased as a result of pressure on the safety member, or should it fall as a result of leakage, the resulting movement of the shutter 155 will cause it to cut off light from the cell 157. This is arranged, through suitable electrical circuits (not shown) to operate the hoist control so as to prevent movement of the hoist platform.

Figure 9:
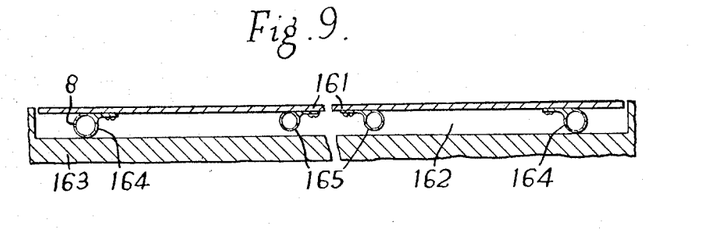
FIGURES 9 and 10 are diagrammatic sectional views showing modified forms of safety members and methods of mounting them.

In FIGURE 9 a safety member is shown in the form of a plate 161, which is arranged in a recess 162 in the ground or floor 163 on which the hoist is mounted. The plate 161 is supported by pressure tubing which is similar to that which has been described with reference to FIGURES 1 to 4 except that it includes part or lengths of different cross-section areas. The tubing 164 near the edges of the plate 161 has a greater cross-sectional area than the tubing 165 nearer the centre of the plate. This arrangement makes the safety mechanism more sensitive to forces acting on the safety member 161 near the edges of the latter than at its centre.

Figure 10:
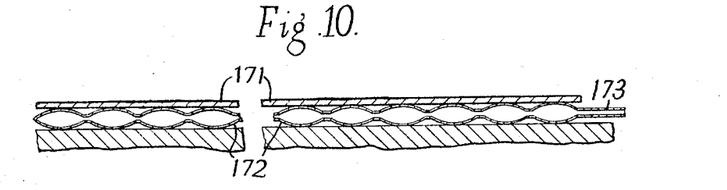

In FIGURE 10 the safety member 171 is shown supported on a quilt 172 which takes the place of the tubing previously described and which, like the latter, is filled with liquid. It is connected by a pipe 173 to a safety control unit, which latter may be of any of the kinds which have been described. Pressure on any part of the safety member 171 will increase the pressure of the liquid and will cause it to operate the safety control unit.

Figure 11:
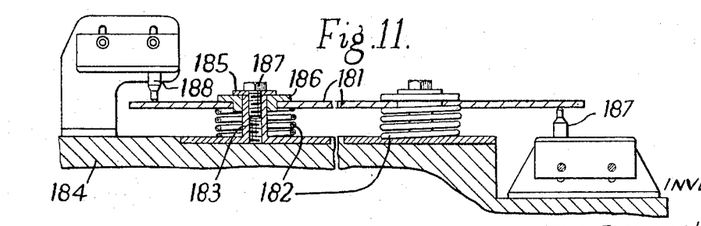
FIGURES 11 to 15 are detail sectional views showing, somewhat diagrammatically, a number of other methods of mounting a safety plate or like safety member and of arranging for it to operate control means used to stop downward movement of the hoist platform.

FIGURE 11 shows an arrangement in which the safety member or plate, which is here shown at 181, is arranged to operate one or more micro-switches directly, instead of using a liquid as an intermediary. The plate 181 is resiliently supported at a number of spaced points. This may be done by means of springs 182, as shown, or blocks or strips of a resilient material could be used.

In FIGURE 11 the springs 182 which are used are shown as being fitted round hollow studs 183 which are mounted on and project from the floor 184, upward movement of the member 181 being limited by washers 185 and 186 and screws 187 fitted to the studs.

Downward movement of any part of the member 181 is arranged to operate at least one of a number of micro-switches which are fitted at suitable positions around its periphery. Such switches may be mounted beneath the member 181, as in the case of the switch 187, or they may be mounted above it, as shown at 188. In either case the switches, which are connected in series with each other and with the motor control, are arranged to be closed when the member 181 is in its normal raised position, but to open should any part of the member 181 be pressed down.

Figure 12:
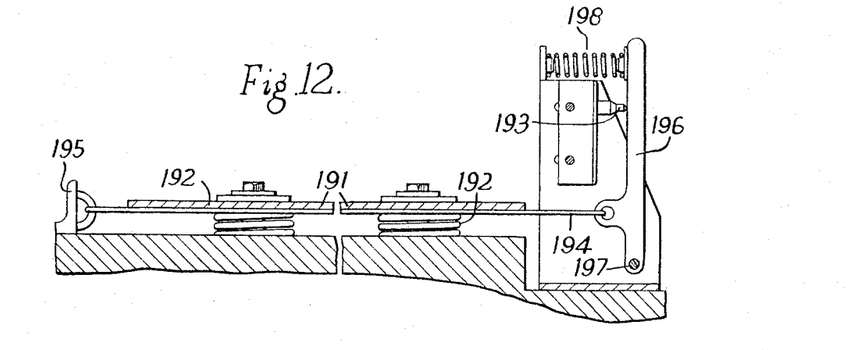

FIGURE 12 shows a safety member 191 which is supported by springs 192 and which is arranged to operate one or a number of micro-switches 193 through the intermediary of a wire or cable 194. This cable 194 is held under tension beneath the member 191 between a fixed anchorage 195 at one side of the member 191 and a lever 196 at the other side of this member, the lever 196 being pivoted at 197 and being acted upon by a compression spring 198. Downward movement of any part of the member 191 above the cable 194 will cause the latter to operate the lever 196, against the force of the spring 198, this movement of the lever operating the normally-closed micro-switch 193.

Figure 13:
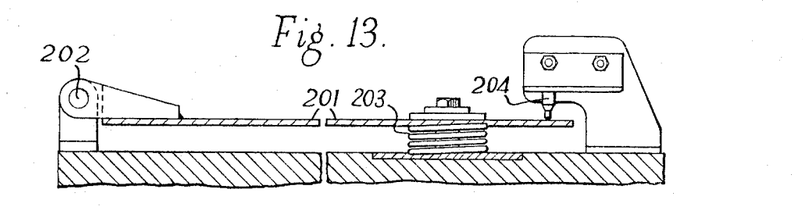

Although it is preferred that the safety member should be so supported that downward movement of any part of it will operate a safety mechanism this is not always essential, particularly where a person or object is only likely to get under the hoist platform near one side of the latter. FIGURE 13 shows a construction in which the safety member 201 is pivotably supported at one side by pivots 202 and has its other side resiliently supported by springs or other means 203. In this case one or a number of micro-switches 204 need only be provided along one side of the member 201.

Figure 14:
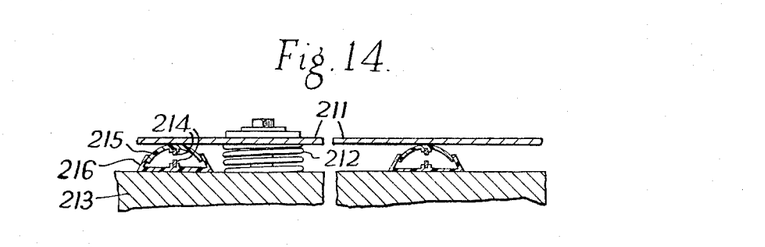

FIGURE 14 shows a safety member 211 which is supported by springs, one of which is shown at 212. Between the member 211 and the floor 213 on which it rests there are fitted a number of pairs of switch contacts or contact strips 214. These are arranged within cups or channels 215 and 216, the latter being made of an insulating material, which is preferably resilient. As shown, the contacts 214 are normally open, so the pairs of contacts would be connected in parallel with each other to ensure that closing of any of the contacts would operate the motor control.

Figure 15:
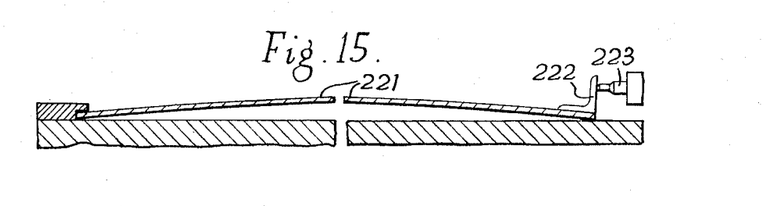

FIGURE 15 shows a safety member 221 which is in the form of an upwardly bowed plate. This plate carries one or a number of arms 222 at or near one or both of its opposite side edges, the or each of which arms normally engages a micro-switch 223. Downward movement of the central part of the member 221, by increasing the width of the latter, will cause it to operate the switch 223 to prevent movement of the hoist.

Figure 16:
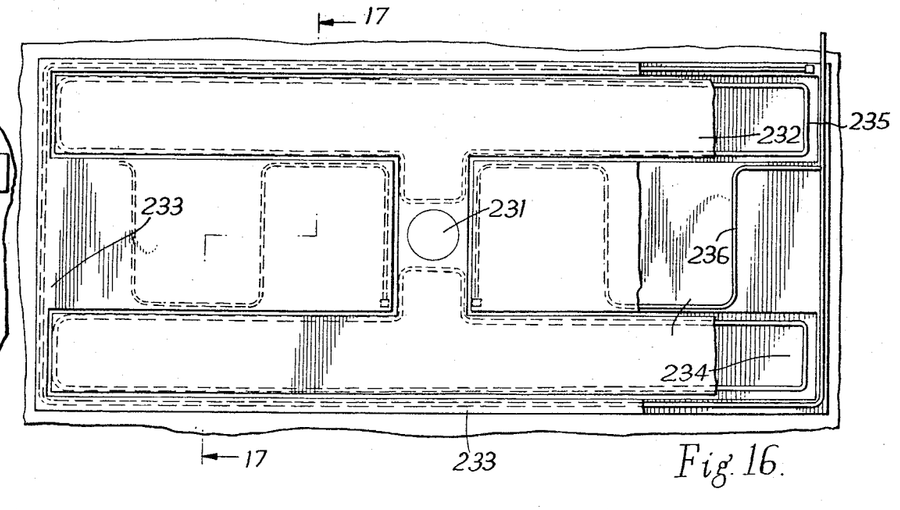
FIGURE 16 is a plan view showing safety mechanism which includes a safety member in the form of a plurality of plates or the like which are arranged to cover the floor around the platform of a hoist, which latter may be of a kind having one or more rams for raising and lowering the platform.
Figure 17:
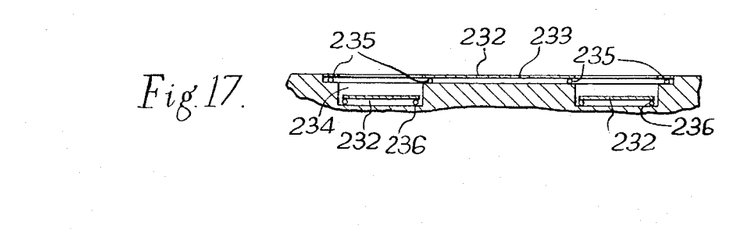
FIGURE 17 is a section taken on the line 17—17 of FIGURE 16.

FIGURES 16 and 17 show how safety members or plates may be arranged to provide safeguards for hoists of the single ram or of other types in which it is desired that the platform should be capable of being lowered until its upper surface is level with the ground. In such cases each hoist may be provided with two or more safety members or plates, one or more of which may be arranged in a recess into which the platform can be lowered, a further safety member or members being arranged around this recess.

Thus the arrangement shown in FIGURES 16 and 17, which is intended for use with a hoist having a platform of H-shape (not shown) mounted on a single column, the position of which latter is indicated at 231, makes use of an inner safety member 232, which is of a similar H-shape to the platform, and of an outer safety member 233 of a complementary shape. The member 232 is fitted in an H-shaped recess 234 in the ground whilst the member 233 is fitted in a shallower recess so that its upper surface is flush with the surface of the ground. The member 233 is formed with a cut-out through which the platform can be lowered into the recess 234 so that the top of the platform can be brought down level with the ground.

It will be understood that the safety members 232 and 233, which together cover substantially the entire area beneath the hoist platform and which are shown as being supported on pressure tubing 235 and 236 to operate the safety control, provide full protection over the complete area beneath the platform. Operation of either safety member will stop the hoist. Should the hoist be of a kind in which the platform can be rotated about its central axis, then the safety member 233 could be extended to be of circular shape.

Figure 18:
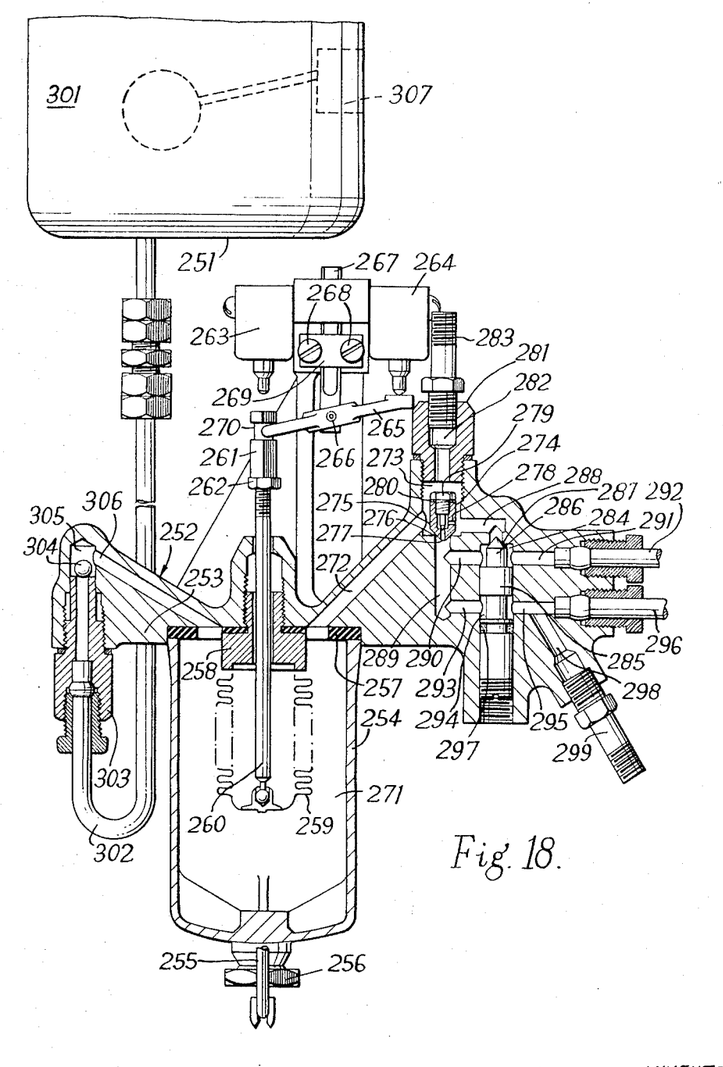
FIGURE 18 is a view similar to FIGURES 6 and 7 but showing another modification.

FIGURE 18 shows a modified form of control system which may be used in place of those shown in FIGURES 6, 7 8 and 9. This system, which comprises a feed unit 251 and a control unit 252 has these units connected to the two ends of the pressure tubing of the safety member as is the case with the system shown in FIGURE 7; this provides improved sensitivity. It also overcomes a disadvantage which has been experienced with the system shown in FIGURE 7, in which a progressive increase in pressure may occur.

This is due to the fact that when a load is suddenly removed from the safety member a negative pressure may be created briefly in the pressure tubing, which may allow fluid to be drawn in from the reservoir 101 through the non-return valve 102 which prevents its return to the reservoir.

Description

This unit 252 comprises a main body 253 which may be mounted on one of the columns of the hoist or on another suitable support. A bowl 254 which is preferably made of transparent material, is fitted under part of the body 252, to which it is clipped by means of a stirrup 255 and which is tightened by means of a nut 256. A sealing ring 257 is fitted between the body 253 and the bowl 254.

A plug 258 is screwed into the body 253 within the bowl 254 and carries bellows 259. An operating rod 260 is attached at its lower end to the bellows 259 and it passes slidably through the plug 258. The upper threaded end of the rod 260 carries a head 261 which can be locked in its adjusted position on the rod by tightening a clamping nut 262. This head 261, which is itself arranged to engage and operate a micro-switch 263 is also arranged to operate another micro-switch 264, which it does through a rocker 265. This rocker is pivoted at 266 to an adjustable support 267, which latter is held in its adjusted position by tightening two screws 268, which hold a bridge piece 269. One end of the rocker 265 engages in a groove 270 formed in the head 261, whilst its other end engages and operates the micro-switch 264. Both the switches 263 and 264 are of the normally-closed type and they are both closed when the rod 260 and the rocker 265 are in intermediate positions in which the rocker 265 is substantially horizontal. Downward movement of the rod 260 will cause the switch 264 to be opened by the rocker 265, whereas upward movement of the rod 260 will open the switch 263.

The chamber 271 within the bowl 254 communicates by means of a passage 272 with a chamber 273 which contains a restricted return one-way valve 274. This comprises a valve piston 275 the lower end of which is tapered and normally engages a valve seat 276. Passages 277 and 278 are formed in the piston 275. A screwed plug 279 is screwed into the piston 275 so that its lower, tapered end is in close proximity to the passage 277. The position of this plug 279 is governed by the thickness of a washer 280 and thus an opening is created which will permit a restricted flow of fluid from the chamber 273. This chamber 273 is closed at its upper end by a plug 281 having a central passage 282 into the upper end of which there is screwed a non-return valve 283 of the Schrader or other suitable type.

A chamber 284 formed within the body 253 contains a valve stem 285 which can be adjusted relatively to the body 253 by means of a screw thread at its lower end, which is screwed into the body.

The valve stem 285 is conically formed on a reduced diameter part 286 at its upper end, so as to form a shut-off valve, which it does by engaging a valve seat 287 formed in the body 253 at one end of a passage 288 which communicates between the chambers 273 and 284.

A passage 289 extends downwardly from the chamber 273 and from this a lateral passage 290 communicates with the chamber 284. A further passage 291 communicates between the chamber 284 and a pipe 292 which connects with one end of the pressure tubing (not shown) of the safety member. A passage 293 communicates between the passage 289 and an annular groove 294 formed in the valve stem 285. A passage 295 connects between this annular groove 294 and a pipe 296 leading to the other end of the safety member tubing. A seal in the form of an O ring 297 is arranged between the annular groove 294 and the screw thread on the valve stem 285.

A passage 298 which communicates with the passage 295, is closed at its outer end by a non-return valve 299 of the Schrader or other suitable type.

The feed unit 251 comprises a reservoir 301 which connects via a pipe 302 to a holow plug 303, which is screwed into the body 253. The upper end of this plug 303 forms a valve seating for a non-return valve ball valve 304 which is contained within a chamber 305. A passage 306 communicates between the chamber 305 and the chamber 271.

The mechanism is set up as follows:

The valve stem 285 is screwed downwardly so that its conical end is clear of the seat 287, whilst its annular groove 294 does not communicate between the passages 293 and 295. The non-return valve 283 is opened and the reservoir 301 is filled with fluid (liquid) which will flow through pipe 302, non-return valve 304 and passage 306 into the chamber 271. Air is expelled through the passage 272 and past the non-return valve 283. When fluid emerges from valves 283, indicating that all air has been expelled, this valve 283 is closed. The non-return valve 299 is then opened and fluid will flow via the passages 288 and 291 and pipe 292 into the tube of the safety member, expelling air via the pipe 296, the passages 295 and 298 and the non-return valve 299. This valve is closed when liquid emerges. Liquid is added to the reservoir 301 as necessary during this priming process.

The valve stem 285 is then screwed in until its conical end engages the valve seat 287, thus closing the passage 288 and allowing communication between the passages 293 and 295 via the annular groove 294.

The head 261 on the rod 260 is adjusted so that the rocker 265 is in its intermediate position and the switches 263 and 264 are closed. The system is now ready for use.

Any increase in pressure due to an object or person pressing on the safety member will be transmitted to the fluid in the chamber 271, since the non-return valve 304 prevents return of the fluid to the reservoir 301. The bellows 289 is compressed, causing the rod 260 to move upwardly, opening the micro-switch 263. A release of the force acting on the safety member will allow fluid to flow back to the pressure tubing from the chamber 271, thereby allowing the switch 263 to close, which it does after a delay determined by the setting of the valve 274. This valve 274 also prevents surging of fluid in the system due to a sudden removal of load from the safety member. This surge within the system could produce a negative pressure which might cause unwanted fluid to be admitted from the reservoir via the non-return valve 304. The restricting effect of the valve 274 prevents this, and thus the quantity of fluid in the pressure tubing will remain substantially constant.

Stretching or expansion of the pressure tubing will be accommodated by further liquid supplied from the reservoir 301 but should the liquid in the reservoir drop below a certain level, as a result, for example, of leakage in the system, it is arranged to operate a float switch 307. This switch is arranged to operate a warning device (not shown) or, alternatively, it could be arranged to stop further operation of the hoist by being connected in series with the switches 263 and 264.

In the preceding description of the safety mechanism it has generally been assumed that the hoist will be operated by an electric motor, the latter being under the control of one of the safety control units which have been described. The invention is, however, also applicable to hoists which are operated pneumatically or hydraulically. In such cases the control unit could be arranged to actuate a solenoid-operated valve of any suitable type, which would be included in the fluid system of the hoist so that operation of this valve would prevent at least downward movement of the hoist platform.

We claim:

1. Safety mechanism for a hoist having a platform and means for raising and lowering said platform, the said safety mechanism including at least one safety member mounted beneath said platform control means responsive to movement of said safety member due to pressure upon it to prevent at least downward movement of said platform, at least one deformable member containing a fluid, which deformable member at least partially supports the said safety member and is connected to said control means so that downward movement of a part of said safety member displaces some of the fluid and operates the control means to prevent downward movement of the said platform, and a safety control unit to which fluid displaced by downward movement of the safety member is fed, such safety control unit including at least one member which is displaceable in response to a change in the fluid pressure within said deformable member to prevent downward movement of the platform, said control unit further including means responsive both to an increase and a decrease in the volume or pressure of the fluid for preventing downward movement of the platform.

2. Safety mechanism for a hoist having a platform and means for raising and lowering said platform, the said safety mechanism including at least one safety member mounted beneath said platform, control means responsive to movement of the safety member due to pressure upon it to prevent at least downward movement of the platform, at least one deformable member containing a fluid, which deformable member at least partially supports the said safety member and is connected to the said control means so that downward movement of a part of said safety member displaces some of the fluid and operates the control means to prevent downward movement of the said platform, a safety control unit to which fluid displaced by downward movement of the safety member is fed, said safety control unit including at least one member which is displaceable in response to a change in the fluid pressure within said deformable member to prevent downward movement of the platform, and at least two electrical switches one of which is operated by movement of said displaceable member in one direction and the other of which is operated by movement of the displaceable member in the opposite direction to prevent downward movement of the platform.

3. Safety mechanism for a hoist having a platform and means for raising and lowering said platform, the safety mechanism including at least one safety member mounted beneath said platform, control means responsive to movement of the safety member due to pressure upon it to prevent at least downward movement of the platform, at least one deformable member containing a fluid, which deformable member at least partially supports the said safety member and is connected to the said control means so that downward movement of a part of said safety member displaces some of the fluid and operates the control means to prevent downward movement of said platform, a safety control unit to which fluid displaced by downward movement of the safety member is fed, said safety control unit including at least one member which is displaceable in response to a change in the fluid pressure within said deformable member to prevent downward movement of the platform, a light source, a photo-electric cell, means responsive to movement of the displaceable member to interrupt the passage of light to said cell, and means responsive to such interruption of light reaching the cell for preventing at least downward movement of the platform.

4. Safety mechanism for a hoist having a platform and means for raising and lowering said platform, the said safety mechanism including at least one safety member mounted beneath said platform, control means responsive to movement of the safety member due to pressure upon it to prevent at least downward movement of the platform, and means delaying any downward movement of the platform, once its movement has been prevented by operation of the safety mechanism, for a predetermined delay time after the said safety member has returned to its original position.

5. Safety mechanism for a hoist having a platform and means for raising and lowering said platform, the said safety mechanism including at least one safety member mounted beneath said platform, control means responsive to movement of the safety member due to pressure upon it to prevent at least downward movement of the platform, at least one deformable member containing a fluid, which deformable member at least partially supports the said safety member and is connected to the said control means so that downward movement of a part of said safety member displaces some of the fluid and operates the control means to prevent downward movement of the said platform, and means for restricting return flow of the fluid when said safety member is released for return to its original position, for delaying any subsequent downward movement of the platform.

6. Safety mechanism for a hoist having a platform and means for raising and lowering said platform, said safety mechanism including a safety member mounted beneath said platform, at least one fluid container which is adapted to be reduced in volume by displacement of the safety member produced by an obstruction beneath the platform, a control unit which is connected to the fluid container and which is adapted to be operated by the fluid discharge from said container to prevent downward movement of the platform, and means for restricting return flow of the fluid to said fluid container after removal of the obstruction in order to delay subsequent movement of the hoist platform.

7. Safety mechanism for a hoist having a platform and means for raising and lowering said platform, said safety mechanism including at least two safety members, one of said safety members being mounted in a recess in the floor beneath the platform so that the top of the safety member is substantially level with the surface of the floor, said recess being adapted to receive the platform when the latter is lowered, the other of said safety members at least partially surrounding the said recess adjacent the surface of the floor, and control means responsive to movement of the safety member due to pressure upon it to prevent at least downward movement of the platform.

8. Safety mechanism for a hoist having a platform and means for raising and lowering said platform, the said safety mechanism including at least one safety member mounted beneath said platform, control means responsive to movement of the safety member due to pressure upon it to prevent at least downward movement of the platform, at least one deformable member containing a fluid, which deformable member at least partially supports the said safety member and is connected to the said control means so that downward movement of a part of said safety member displaces some of the fluid and operates the control means to prevent downward movement of the said platform, a safety control unit to which fluid displaced by downward movement of the safety member is fed, said safety control unit including at least one member which is displaceable in response to a change in the fluid pressure within said deformable member to prevent downward movement of the platform, means for keeping the fluid in said deformable member at an excess pressure greater than atmospheric, and means responsive to a drop in pressure or to loss of fluid for preventing downward movement of the platform.

9. Safety mechanism for a hoist having a platform and means for raising and lowering said platform above a floor surface, the safety mechanism including at least one deflectable floor plate mounted beneath said platform substantially contiguous with the floor surface and deflectable under the force of a load thereon, pressure responsive means interposed between said platform and the floor for providing a signal in response to deflection of said plate, and control means connected to said pressure responsive means for controlling at least downward movement of said platform in response to said signal.

10. Safety mechanism as set forth in claim 9 above wherein said pressure responsive means includes electrical means responsive to deflection of said plate relative to said floor to provide said signal.

11. Safety mechanism as set forth in claim 9 above wherein said pressure responsive means includes resiliently-deformable structure filled with a fluid positioned to provide a signal in the form of a fluid pressure change upon deflection of said floor plate.

12. Safety mechanism as set forth in claim 11 above wherein said structure includes fluid filled flexible tubing.

13. Safety mechanism as set forth in claim 12 above wherein said plate rests upon and is resiliently supported by said tubing.

References Cited by the Examiner

UNITED STATES PATENTS

| | | | |
|---|---|---|---|
| 443,282 | 12/1890 | Holmes | 187—41 |
| 1,614,675 | 1/1927 | Jones | 187—41 |
| 2,121,179 | 6/1938 | Sweetland. | |
| 2,264,479 | 12/1941 | Munson. | |
| 2,546,433 | 3/1951 | Dick. | |

FOREIGN PATENTS

| | | |
|---|---|---|
| 255,801 | 2/1949 | Switzerland. |

SAMUEL F. COLEMAN, *Primary Examiner.*